United States Patent [19]
Yu et al.

[11] Patent Number: 5,790,446
[45] Date of Patent: Aug. 4, 1998

[54] FLOATING POINT MULTIPLIER WITH REDUCED CRITICAL PATHS USING DELAY MATCHING TECHNIQUES

[75] Inventors: Robert K. Yu, Newark; Gregory B. Zyner, San Jose, both of Calif.

[73] Assignee: Sun Microsystems, Inc., Palo Alto, Calif.

[21] Appl. No.: 498,145

[22] Filed: Jul. 5, 1995

[51] Int. Cl.⁶ ............................... G06F 7/52; G06F 7/44
[52] U.S. Cl. .................... 364/757; 364/754; 364/748.09
[58] Field of Search ........................... 364/754, 757, 364/758, 759, 760, 748.09

[56] References Cited

U.S. PATENT DOCUMENTS

| | | | |
|---|---|---|---|
| 5,150,319 | 9/1992 | Zyner | 364/745 |
| 5,504,915 | 4/1996 | Rarick | 364/760 |
| 5,544,084 | 8/1996 | Fukumoto | 364/760 |

OTHER PUBLICATIONS

W.K. Luk and J.E. Vuillemin, "Recursive Implementation of Optimal Time VLSI Integer Multipliers", VLSI 1983, F. Anceau and E.J. Aas, Elsevier Science Publishers, pp. 155–168.

Masato Nagamatsu, Shigeru Tanaka, Junji Mori, Tatsuo Noguchi and Kazuhisa Hatanaka, "A 15 NS 32×32-Bit CMOS Multiplier with an Improved Parallel Structure" IEEE 1989 Customer Integrated Circuits Conference, pp. 10.3.1–10.3.4.

Yoshihisa Harata, Yoshio Nakamura, Hiroshi Nagase, Mitsuharu Takigawa, Naofumi Takagi, "A High–Speed Multiplier Using a Redundant Binary Adder Tree", IEEE Journal of Solid–State Circuits, vol. SC–22, No. 1, Feb. 1987, pp. 28–34.

Yoshihisa Harata, Yoshio Nakamura, Hiroshi Nagase, Mitsuharu Takigawa, Naofumi Takagi, "High Speed Multiplier Using a Redundant Binary Adder Tree", pp. 165–170.

Primary Examiner—Tan V. Mai
Attorney, Agent, or Firm—Limbach & Limbach L.L.P.

[57] ABSTRACT

A floating point multiplier with partial support for subnormal operands and results uses radix-4 or modified Booth encoding and a binary tree of 4:2 compressors to generate the 53×53 double-precision product. Delay matching techniques in the binary tree stage and in the final addition stage reduce cycle time. Improved rounding and sticky-bit generating techniques further reduce area and timing. The overall multiplier has a latency of 3 cycles, a throughput of 1 cycle, and a cycle time of 6.0 ns.

24 Claims, 15 Drawing Sheets

1

FLOATING POINT MULTIPLIER WITH REDUCED CRITICAL PATHS USING DELAY MATCHING TECHNIQUES

BACKGROUND OF THE INVENTION

1. Field of the Invention

The present invention relates to floating point multipliers, and in particular, to floating point multipliers with reduced critical path delays.

2. Description of the Related Art

Multiplier units are commonly found in digital signal processors and, more recently, in RISC-based processors. Double-precision floating point operations involve the inherently slow operation of summing 53 partial products together to produce the product. Multiplication compliant with the IEEE 754 standard also involves the correct rounding of the product, adjustment to the exponent and generation of correct exception flags. Multiplier units embedded in modern RISC-based processors must also be pipelined, small and fast. Judicious functional and physical partitioning are needed to meet all these requirements.

SUMMARY OF THE INVENTION

A floating point multiplier in accordance with the present invention has reduced critical path delays achieved by matching delays and reducing interconnect lengths within the binary tree adder.

A floating point multiplier in accordance with one embodiment of the present invention includes input and output signal terminals and a binary tree adder array. The binary tree adder array is coupled to the input and output signal terminals and is for receiving multiplier data and multiplicand data via the input signal terminals and in response thereto providing product data via the output signal terminals. The binary tree adder array is integrated in a regular structure with multiple edges and is justified along one of such edges with the input and output signal terminals located along another one of such edges. In a preferred embodiment, the binary tree adder array has a folded three-stage pipeline structure with interleaved rows of adders and interconnections between adjacent rows of adders, wherein each row of adders contains an approximately equal number of adders and corresponding interconnections have approximately equal lengths among the rows of adders.

DETAILED DESCRIPTION OF THE INVENTION

Figure 1:
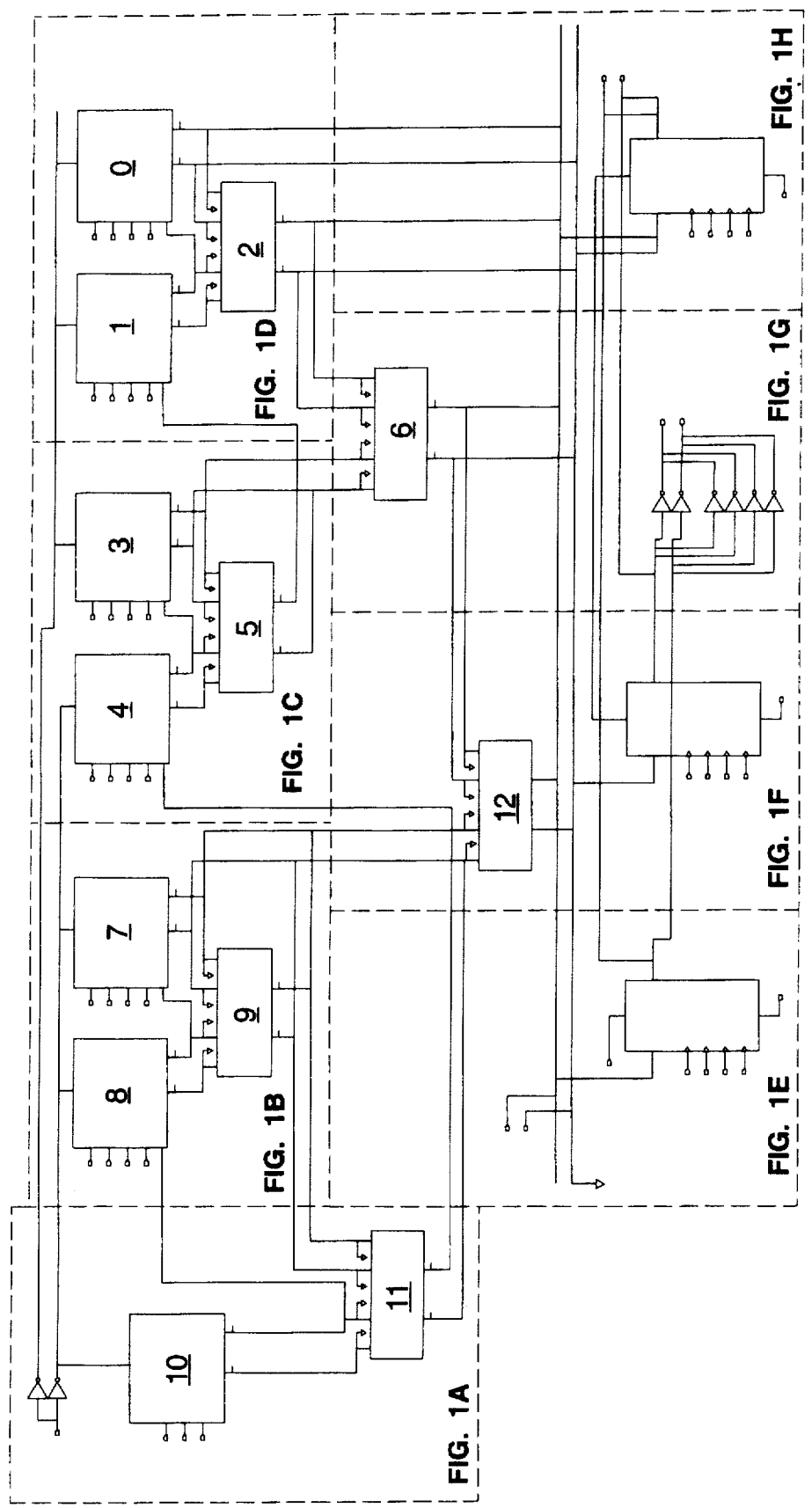
FIG. 1 is functional block diagram of a binary tree adder in accordance with one embodiment of the present invention.
Figure 1A:
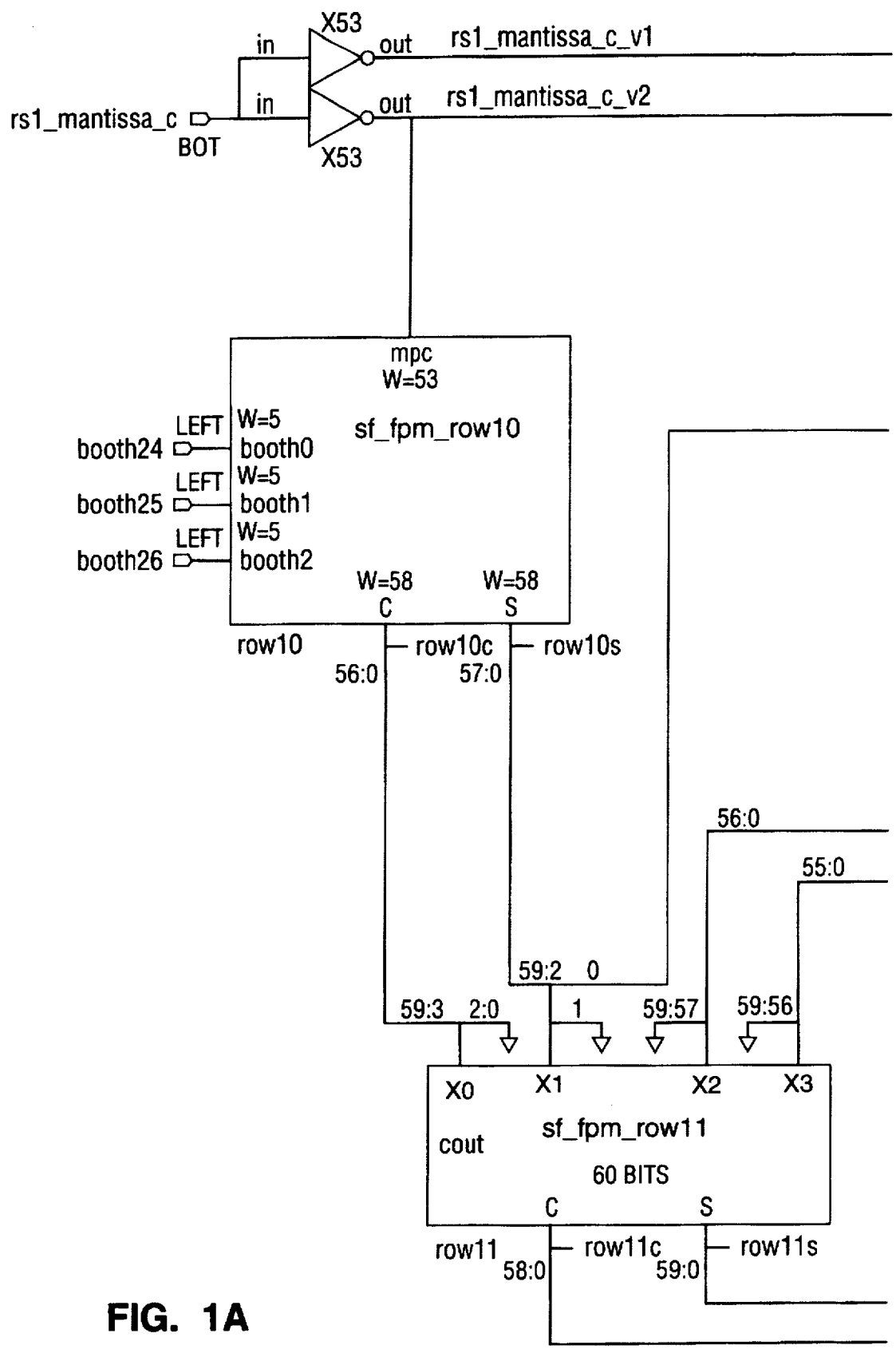
FIG. 1A–1H together form a more detailed version of the functional block diagram of FIG. 1.
Figure 1B:
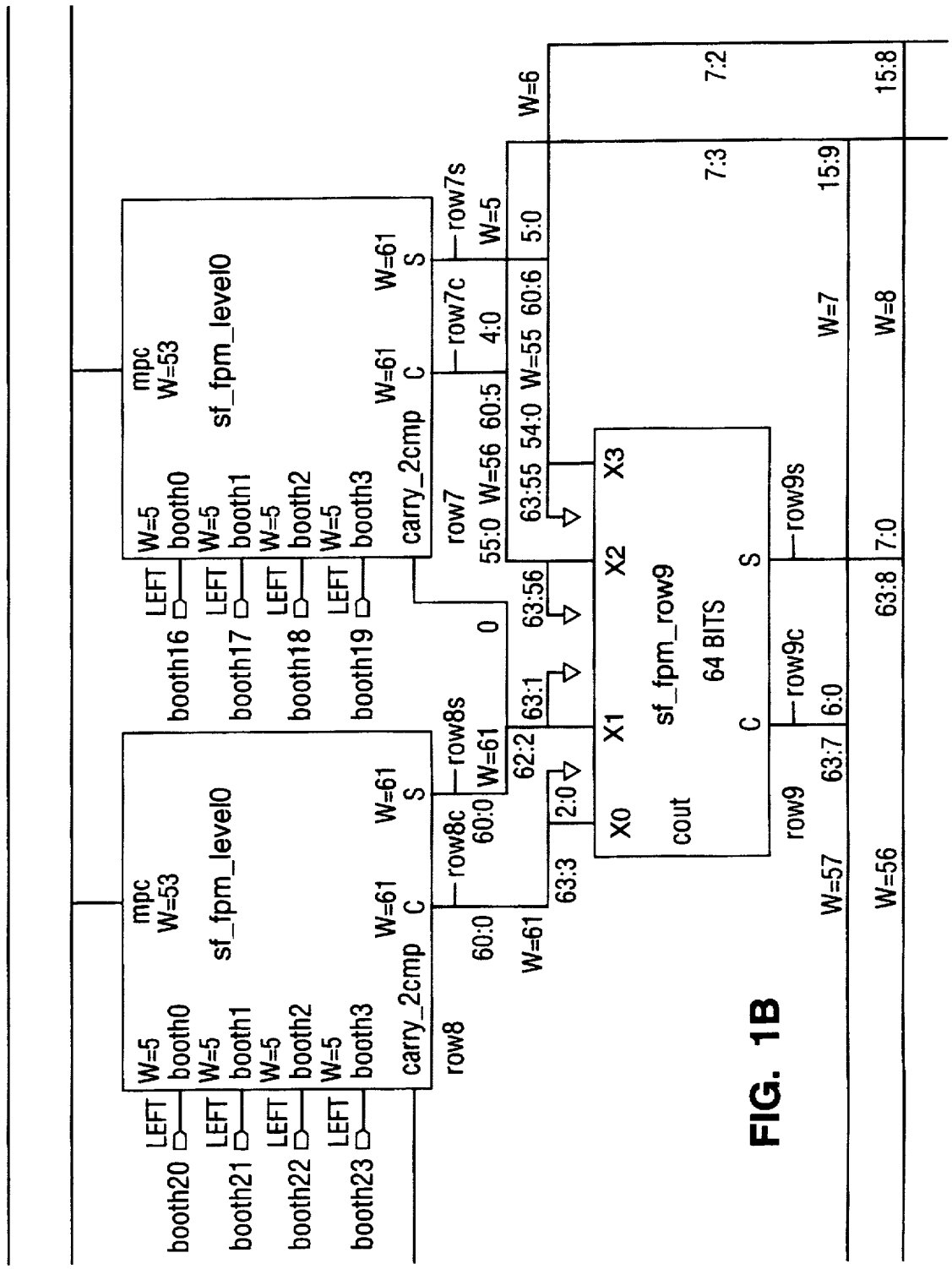
Figure 1C:
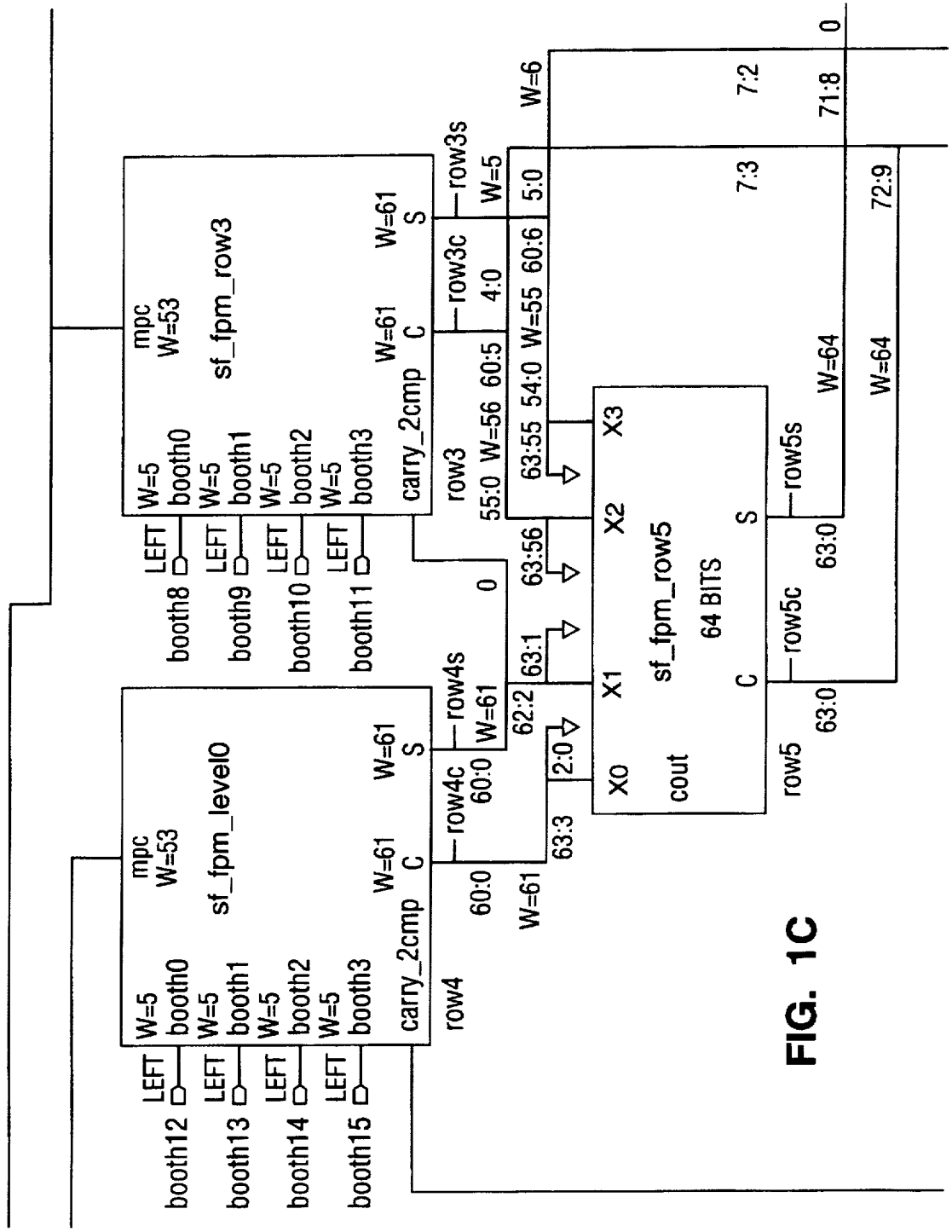
Figure 1D:
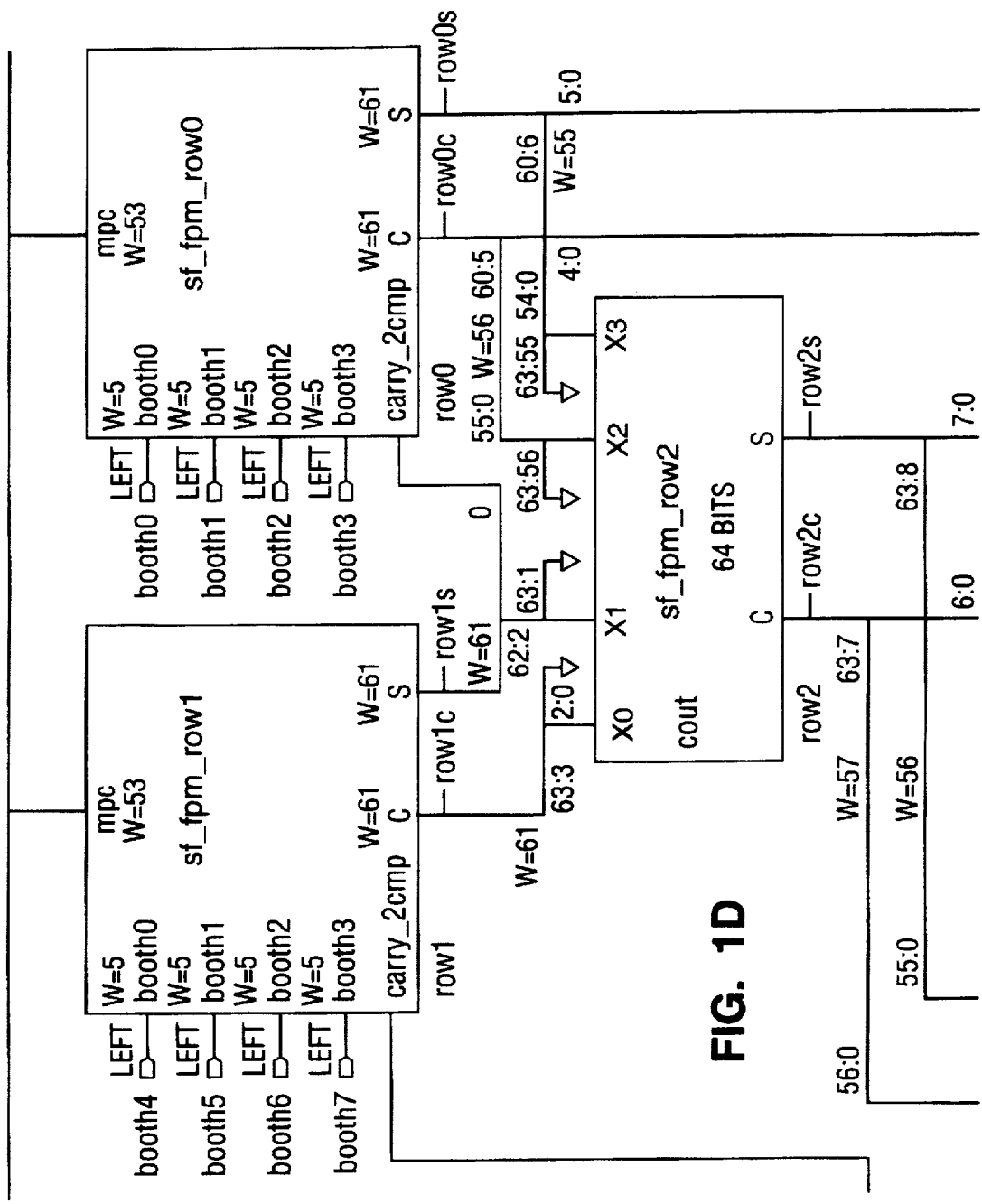
Figure 1E:
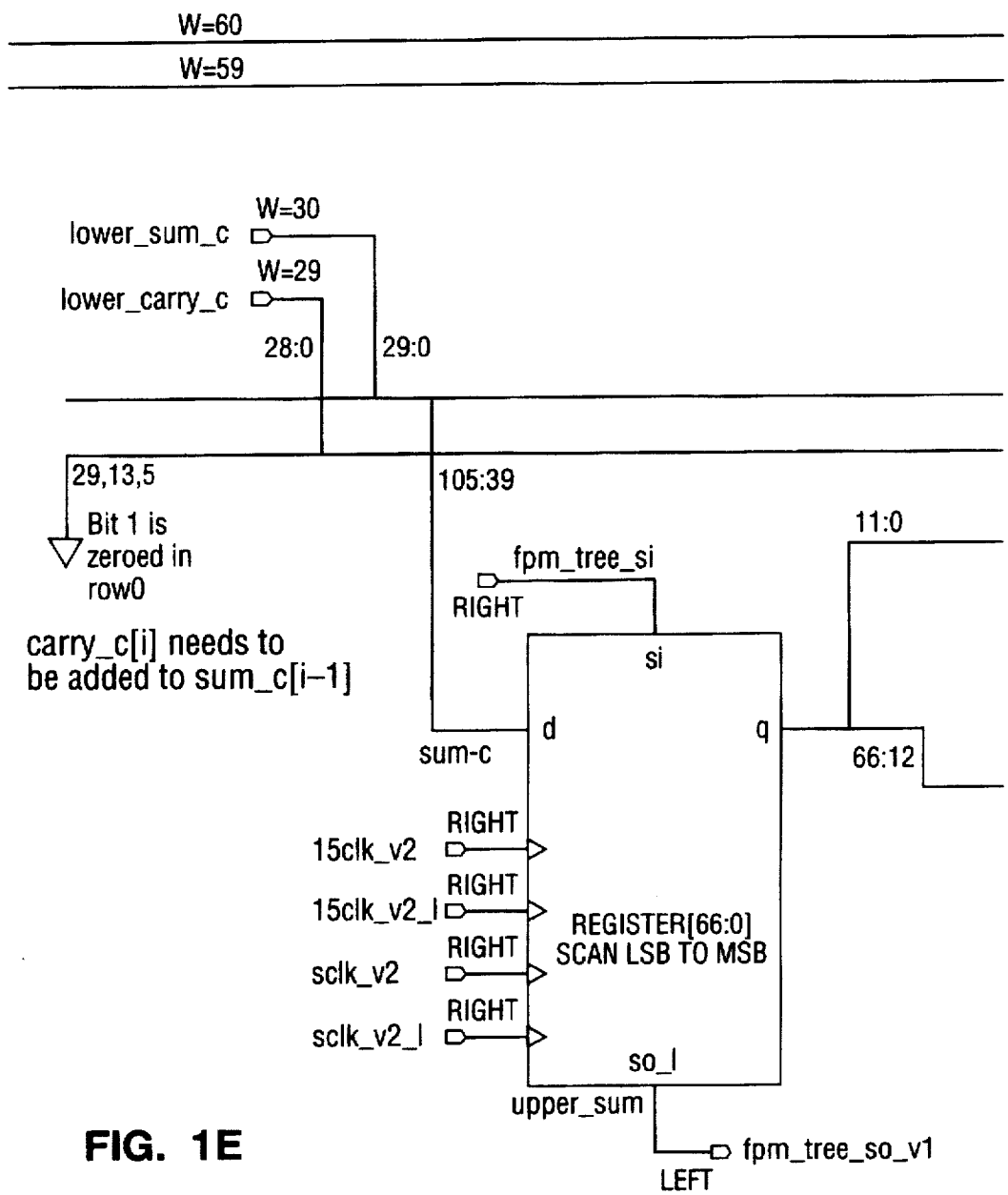
Figure 1F:
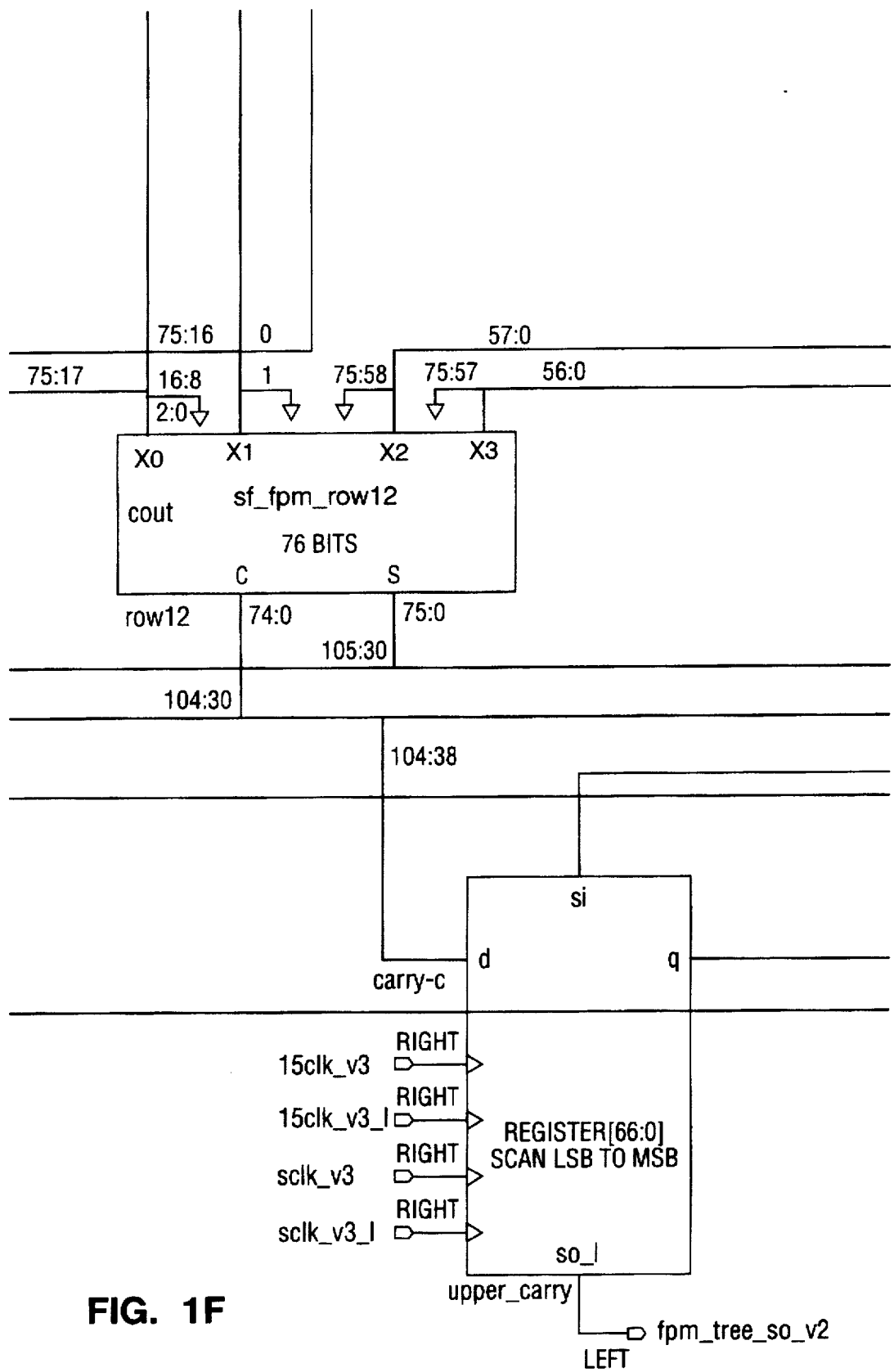
Figure 1G:
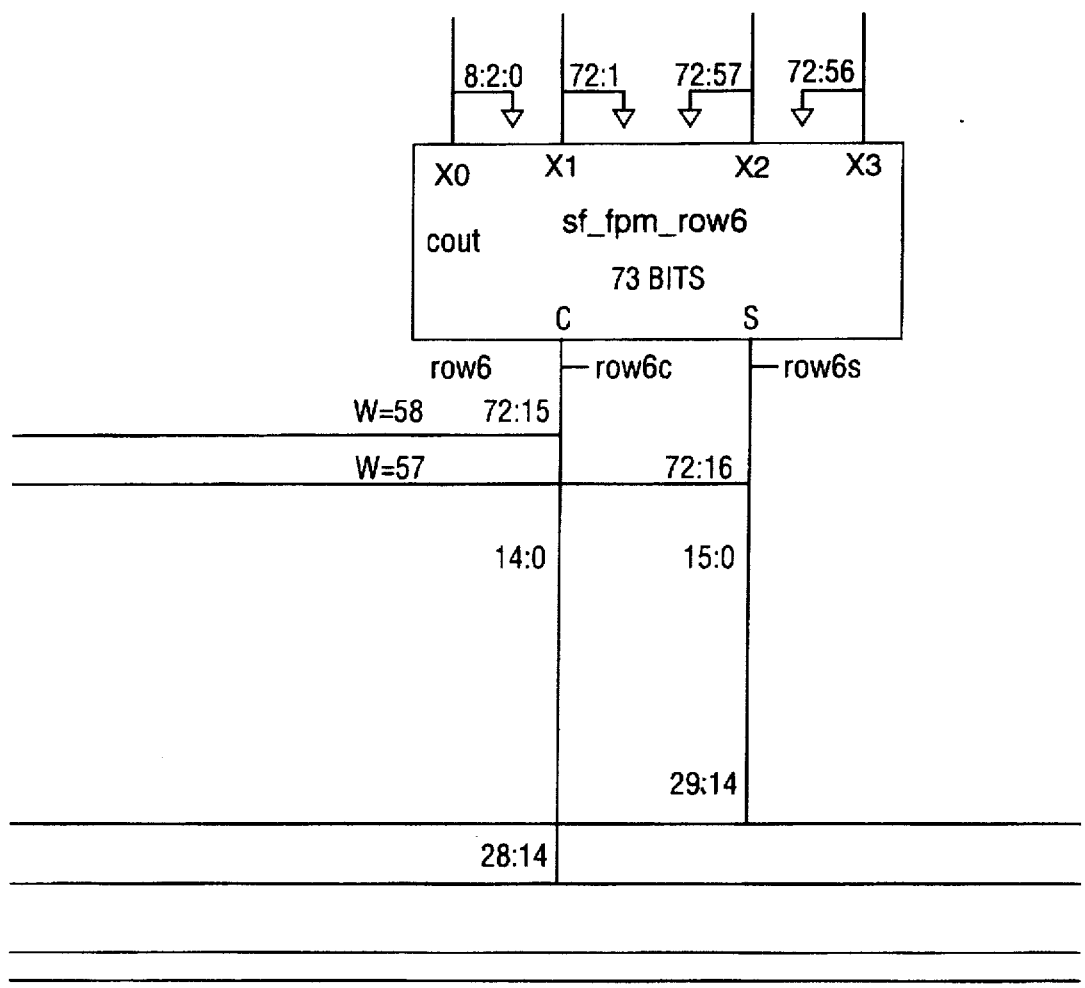
Figure 1G:
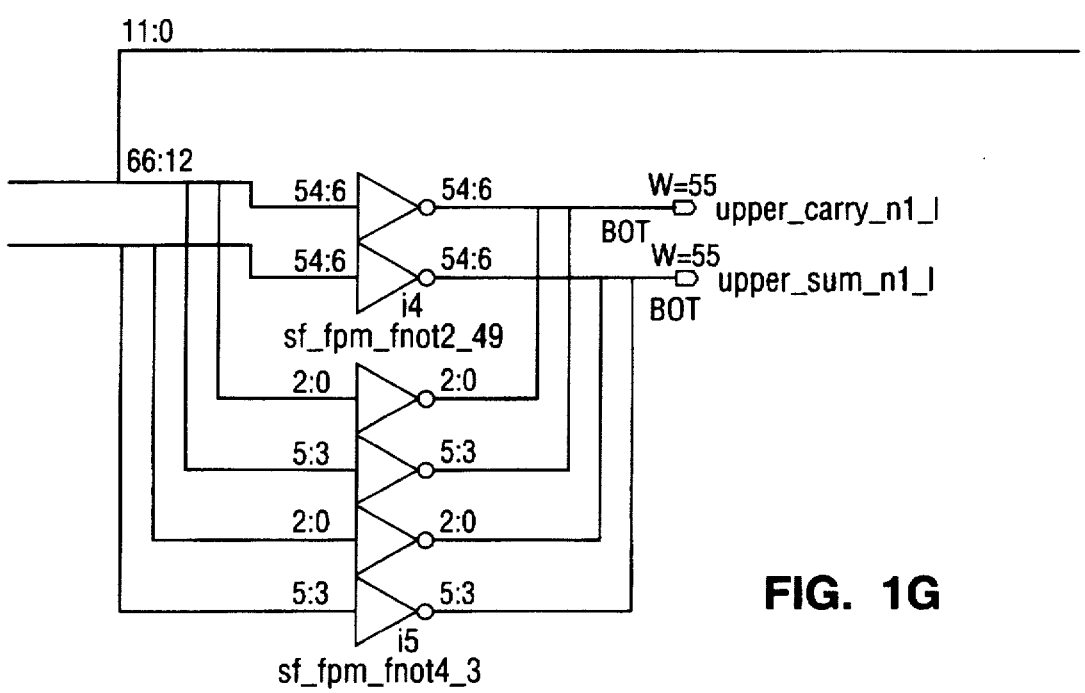
Figure 1H:
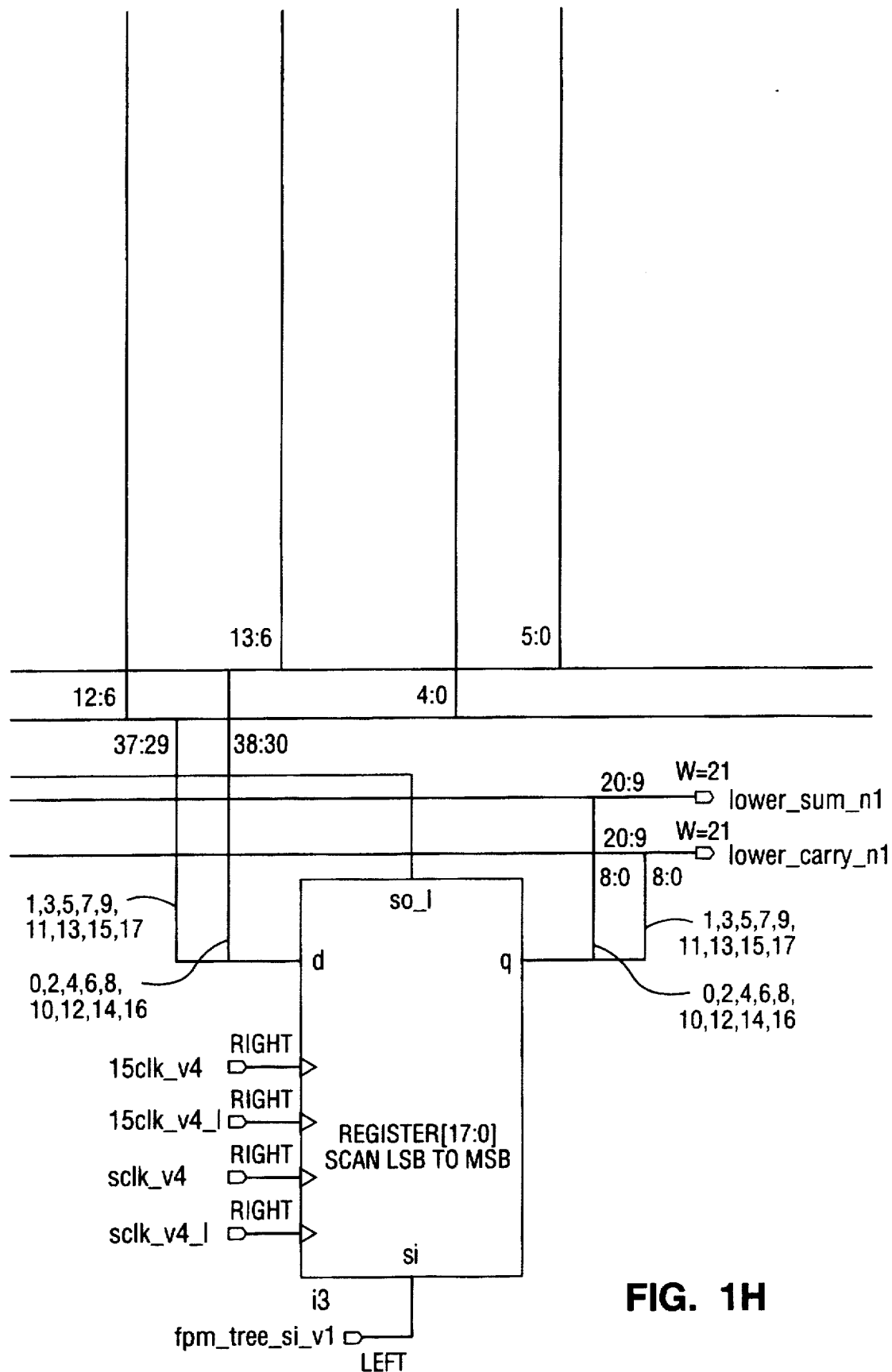

Referring to FIG. 1, the multiplier operates over three stages. (A more detailed version of the diagram of FIG. 1 appears in FIGS. 1A–1H.) In the first stage, the multiplier and multiplicand operands go through the radix-4 modified Booth encoding and multiply tree, respectively. The intermediate summations of partial products and the result of the tree are in carry-save format. In the second stage, a conditional-sum adder is used to determine the product, converting the result from carry-save to binary form. In the third stage, rounding and flag generation is performed. The multiplier has a single-cycle throughput and a three-cycle latency.

The first stage of a 53×53 bit multiplication of the mantissas is performed by a radix-4 modified Booth encoded binary tree of 4:2 compressors, or 5:3 counters. The encoding scheme produces 27 partial products which are generated at blocks 0, 1, 3, 4, 7, 8 and 10. Since 4:2 compressors are used, each block generates 4 partial products, except for block 10 which generates 3.

Figure 2:
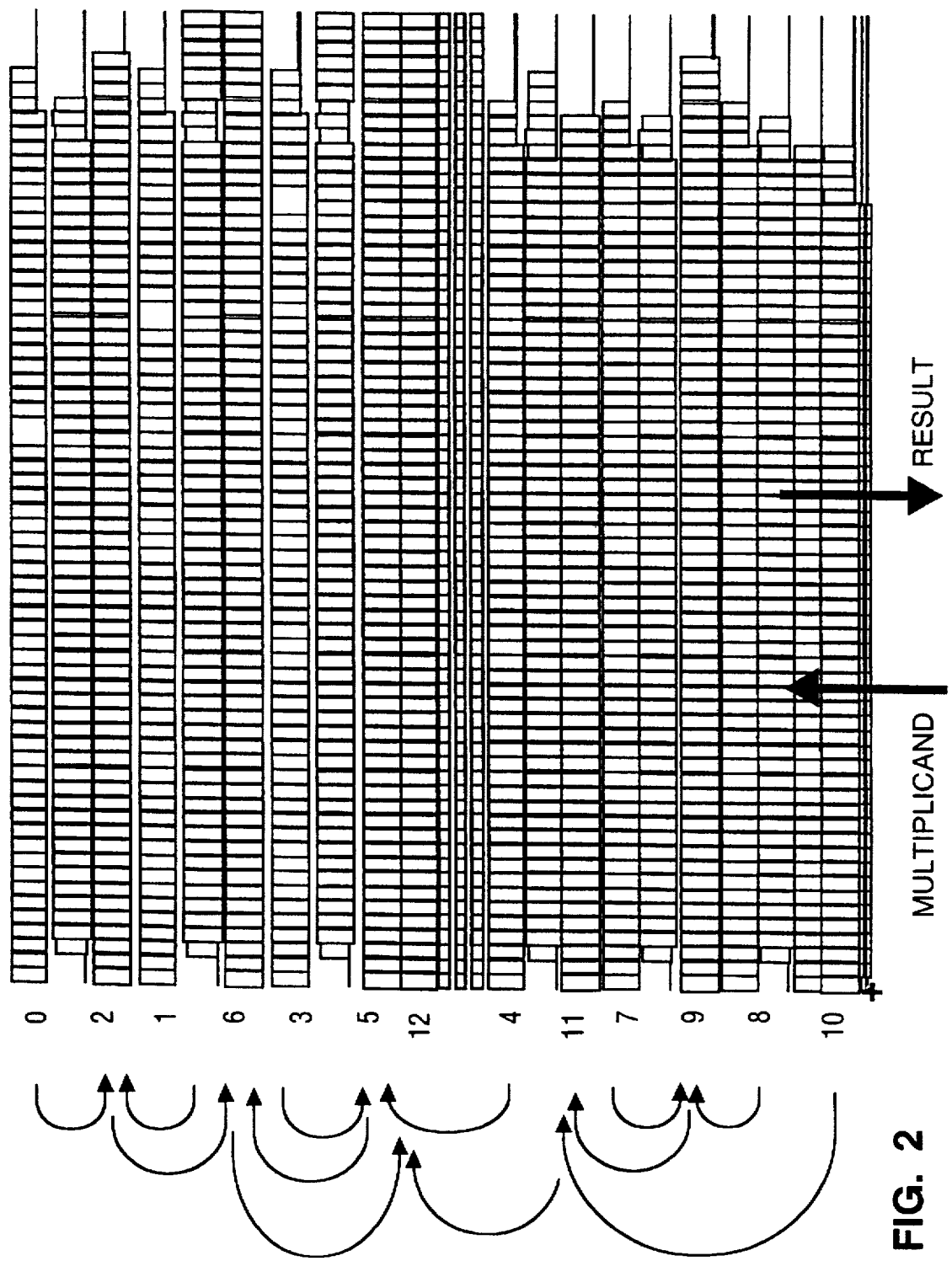
FIG. 2 is a block diagram of the binary tree of FIG. 1 showing the ordering of the rows used to balance the interconnect delays.

Referring to FIG. 2, unlike conventional implementations, where inputs flow starting from the top and side of the tree to the bottom of the tree, this implementation has the multiplier and staged results placed on the same side of the tree. That is, pipeline register are embedded in the tree and are routed to the same side as the multiplicand. The advantage of this approach is to reduce interconnect lengths and to push some of the interconnect delay to the next stage.

The complexity of a binary tree does not lend itself to a straight-forward layout. To minimize the delay through the tree due to interconnects, the placement of the rows of partial product generators and adders are done such that wire lengths are balanced among the rows. Both the vertical distance and the horizontal distance, which comes about because the tree is "left-justified" and is significant in some cases, were taken into account.

Table 1 shows the vertical row distances and horizontal bit distances between cells on different rows. The critical path through the array involve the rows with large horizontal shifts, namely rows 0, 2, 6 and 12. These rows have been placed close together to reduce this path. FIG. 2 shows the placement used.

TABLE 1

| | DISTANCE BETWEEN CELLS | |
|---|---|---|
| ROW TRANSITION | HORIZONTAL DISTANCE | VERTICAL DISTANCE |
| 0 → 2 | 9 | 1 |
| 1 → 2 | 1 | 2 |
| 3 → 5 | 9 | 1 |
| 4 → 5 | 1 | 3 |
| 7 → 9 | 9 | 1 |
| 8 → 9 | 1 | 2 |
| 2 → 6 | 17 | 3 |
| 5 → 6 | 1 | 3 |
| 9 → 11 | 3 | 3 |
| 10 → 11 | 0 | 7 |
| 6 → 12 | 18 | 4 |
| 11 → 12 | 0 | 4 |

Another problem presented by the irregular tree structure is the differing number of bits in each row, which varied from 61 to 76 bits. In order to reduce the area of the tree, some of the adders in the larger rows were "folded" to rows with fewer cells. The folding was done such that timing was not affected. More folding could be done but not without impacting the critical path through the tree.

Figure 3:
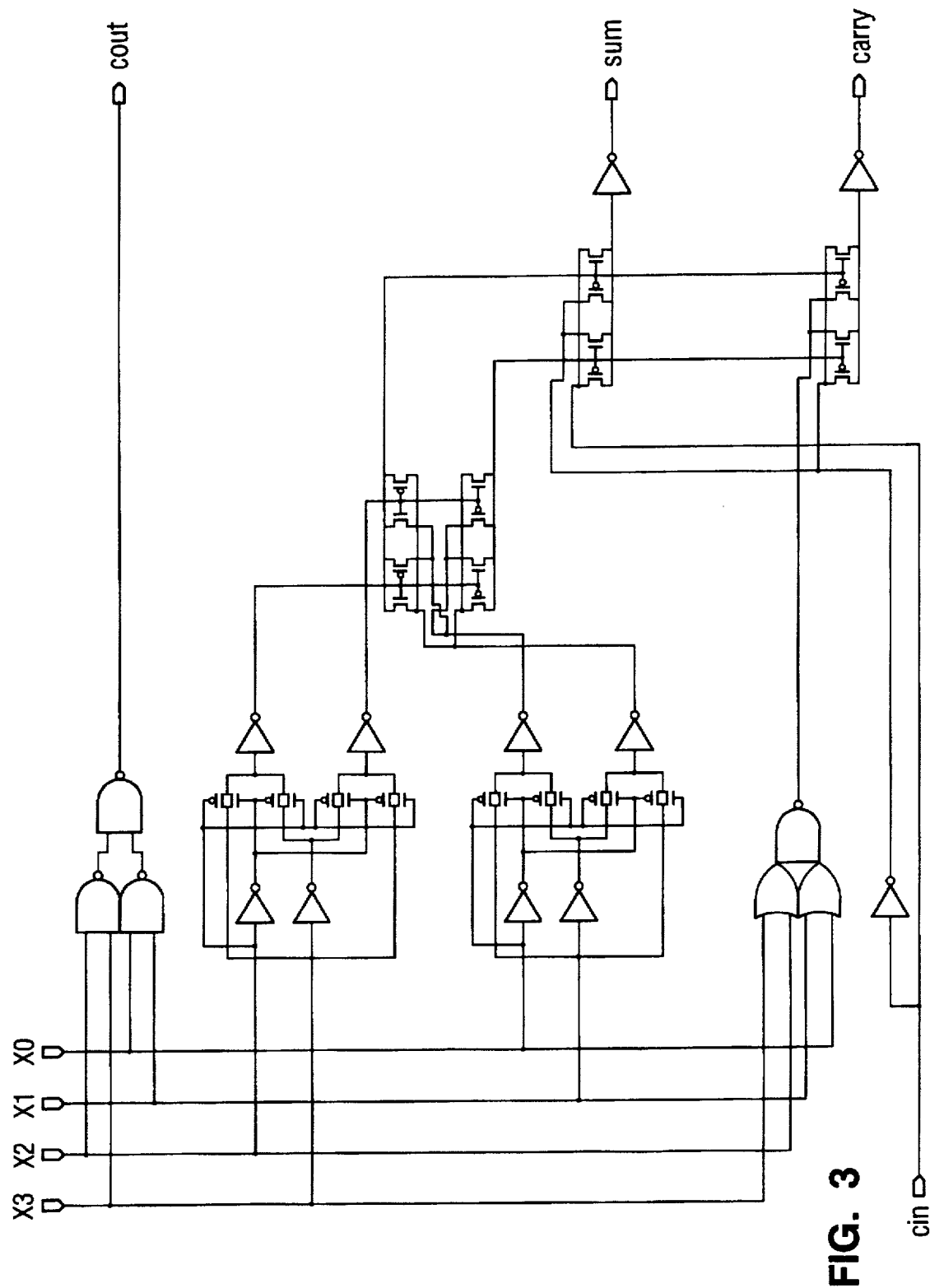
FIG. 3 is a schematic of the 4:2 compressors of FIG. 1.

Referring to FIG. 3, the 4:2 compressor is designed according to Table 2 and includes an adder which takes five inputs {x3, x2, x1, x0 and cin} and generates three outputs {carry, cout and sum}. All inputs and the sum output have a weight of one and the two outputs carry and cout have a weight of two. That is, $$2^0 \cdot (x3+x2+x1+x0+cin) = 2^1 \cdot (carry+cout) + 2^0 \cdot sum \qquad (1)$$

TABLE 2

TRUTH TABLE FOR 4:2 COMPRESSOR

| X3 | X2 | X1 | X0 | COUT | CARRY | SUM |
|----|----|----|----|------|-------|-----|
| 0 | 0 | 0 | 0 | 0 | 0 | cin |
| 0 | 0 | 0 | 1 | 0 | cin | $\overline{cin}$ |
| 0 | 0 | 1 | 0 | 0 | cin | $\overline{cin}$ |
| 0 | 0 | 1 | 1 | 1 | 0 | cin |
| 0 | 1 | 0 | 0 | 0 | cin | $\overline{cin}$ |
| 0 | 1 | 0 | 1 | 0 | 1 | cin |
| 0 | 1 | 1 | 0 | 0 | 1 | cin |
| 0 | 1 | 1 | 1 | 1 | cin | $\overline{cin}$ |
| 1 | 0 | 0 | 0 | 0 | cin | $\overline{cin}$ |
| 1 | 0 | 0 | 1 | 0 | 1 | cin |
| 1 | 0 | 1 | 0 | 0 | 1 | cin |
| 1 | 0 | 1 | 1 | 1 | cin | $\overline{cin}$ |
| 1 | 1 | 0 | 0 | 1 | 0 | cin |
| 1 | 1 | 0 | 1 | 1 | cin | $\overline{cin}$ |
| 1 | 1 | 1 | 0 | 1 | cin | $\overline{cin}$ |
| 1 | 1 | 1 | 1 | 1 | 1 | $\overline{cin}$ |

Figure 4:
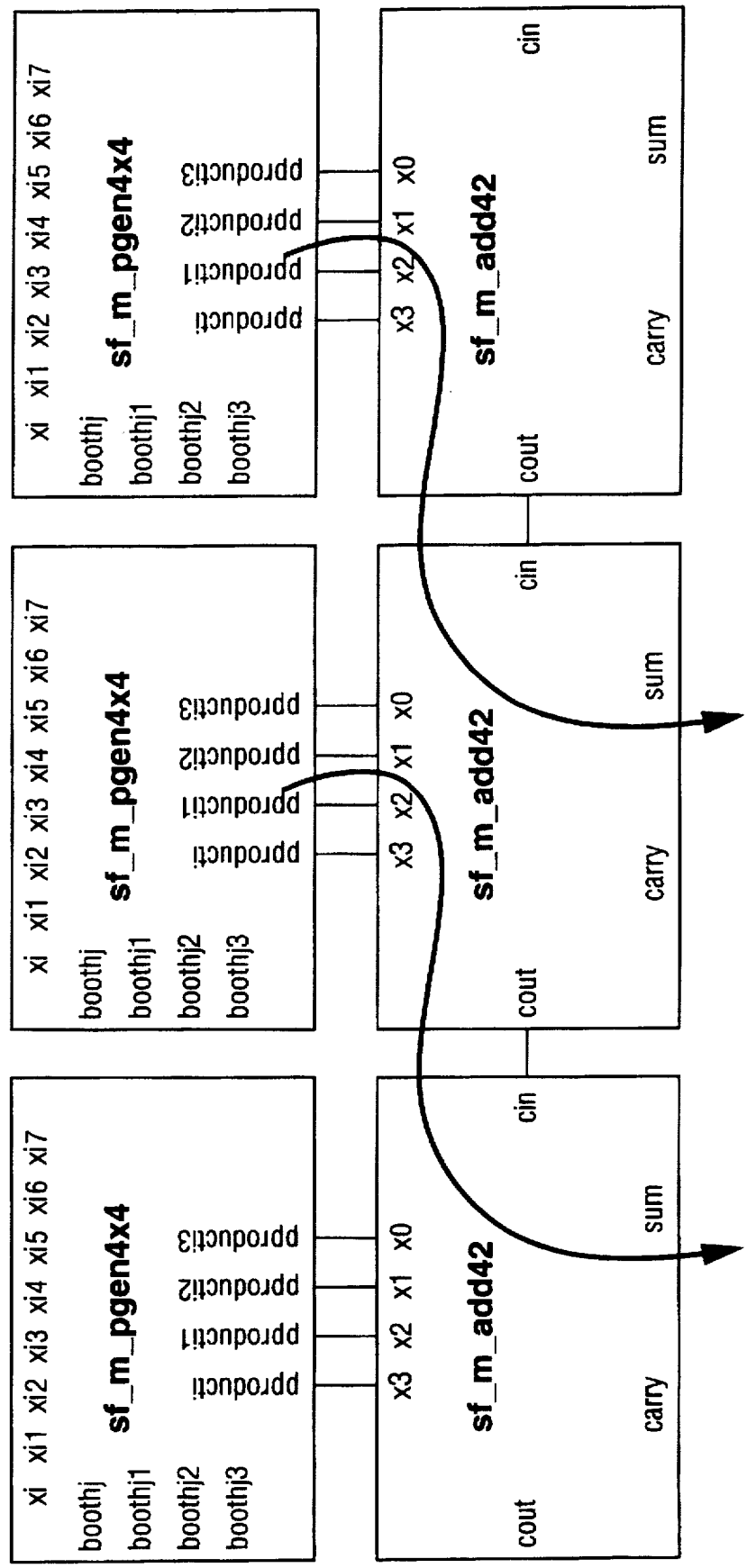
FIG. 4 is a functional block diagram of the 4:2 compressors of FIG. 1 interconnected with no horizontal ripple carry.

Referring to FIG. 4, a row of such adders hooked up together as shown do not exhibit any rippling of carries from cin to cout since the cout signal is independent of the cin input and is only dependent upon the x inputs. The adder is further designed such that the delay from xi to sum or carry is approximately the same as the combined delay from xi to cout, and cin to sum or carry of an adjacent adder.

Figure 5:
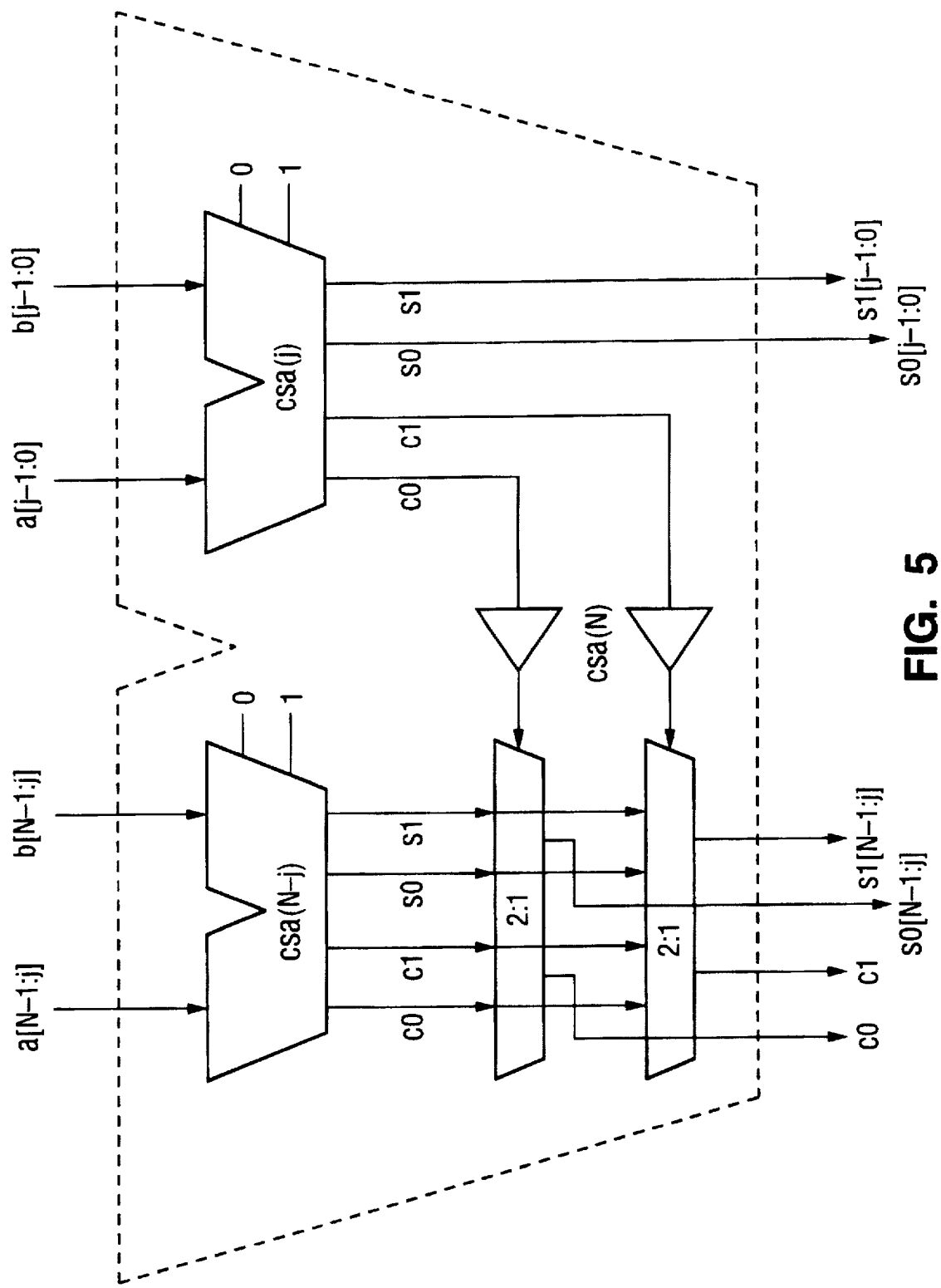
FIG. 5 is a functional block diagram of the conditional sum adders of FIG. 1.

Referring to FIG. 5, the final add stage of the multiplier makes use of a 52-bit conditional sum adder with a recursive structure that is partitioned for minimum delay. As shown, an N-bit conditional sum adder is made up of two smaller conditional sum adders, one that is j-bits wide and one that is N−j bits wide. Two 2:1 multiplexors are used to output the upper sum and carry results; these outputs are selected by the carries from the lower j-bit adder. Typically the selects to the multiplexors are buffered up to handle the capacitive loading due to large fanouts. These smaller adders are, in turn, made up of smaller conditional sum adders.

The delay through this adder is affected by how the adders are partitioned. The delay for an N-bit adder partitioned at position j is defined as T(N,j):

$$T(N,j) = \max[T_{opt}(j) + T_{buf}(N-j) + T_{sel}, T_{opt}(N-j) + t_{mux}] \qquad (2)$$

In Equation 2, $T_{opt}(i)$ is the optimal delay for an i-bit adder, $T_{buf}$ is the buffer delay and is a function of the number of bits on the left adder, or N−j, $T_{sel}$ is the select to out delay of the multiplexor and $T_{mux}$ is the data to out delay of the multiplexor. The optimum delay $T_{opt}(N)$ for an N-bit adder, where j varies from 1 to N−1, is simply:

$$T_{opt}(N) = \min[T(N,j)] \qquad (3)$$

The problem of finding $T_{opt}(N)$ is a recursive min-max problem and lends itself well to an efficient dynamic programming solution developed internally for this implementation.

The sticky bit, which is needed to perform the correct rounding, is generated in the second stage. Typically, the lower 51 bits in carry-save format are summed and ORed together. However, in accordance with the present invention, the sticky bit is generated directly from the outputs of the tree in carry-save format without the need for any 51-bit adder to generate the sum beforehand, resulting in significant timing and area savings. Where $s_i$ and $c_i$ are the sum and carry outputs from the tree:

$$p_i = s_i \oplus c_i \qquad (4)$$

$$h_i = s_i + c_i \qquad (5)$$

$$t_i = p_i \oplus h_{i-1} \qquad (6)$$

The sticky bit is then computed directly by using a ones-detector:

$$sticky = t_0 + t_1 + \ldots + t_{50} \qquad (7)$$

By using a conditional sum adder to generate both the sum and sum+1, an incrementer is not required for performing the rounding operation. Only multiplexing is needed to select the correct result after rounding.

Figure 6:
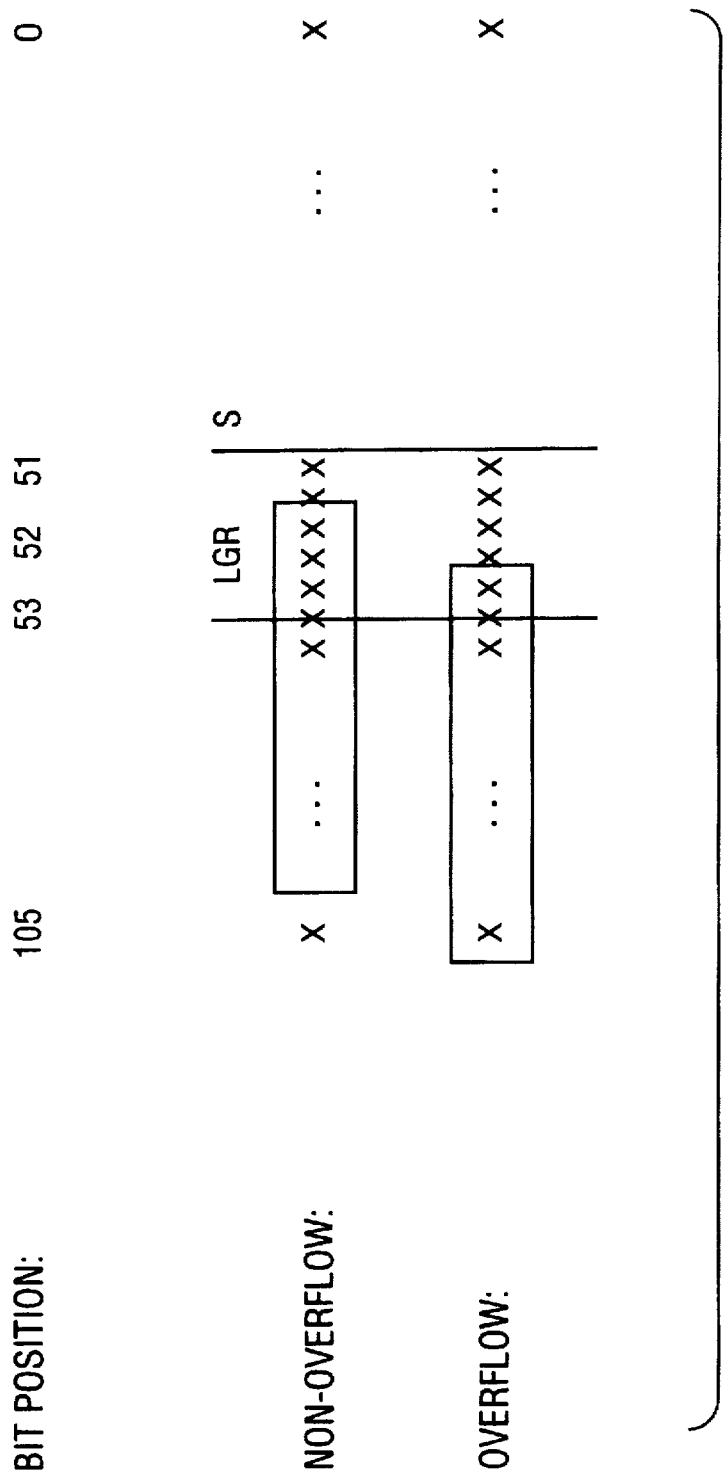
FIG. 6 illustrates mantissa selection for overflow and non-overflow for the binary tree of FIG. 1.

In double precision multiplication, after the 106-bit product (in carry-save format) has been generated by the array, the decimal point occurs between bits 104 and 103, and only the upper 53 bits are used for the mantissa result. The lower 53 bits are needed only to perform the correct rounding. After rounding is performed, either bits 105-53 or bits 104-52 are used, depending on the value of bit 105 or the MSB. If the MSB is set, then the mantissa is taken from bits 105-53 and the value of the exponent is incremented. Otherwise, if the MSB is not set, then bits 104-52 are used and the exponent is not incremented. The rounding itself may propagate to set the MSB; this is the case of overflow after rounding. FIG. 6 shows how the mantissa is selected from the array result depending on bit 105 after rounding. In the figure, L, G, R and S represents the LSB, guard, round and sticky bits, respectively.

Figure 7:
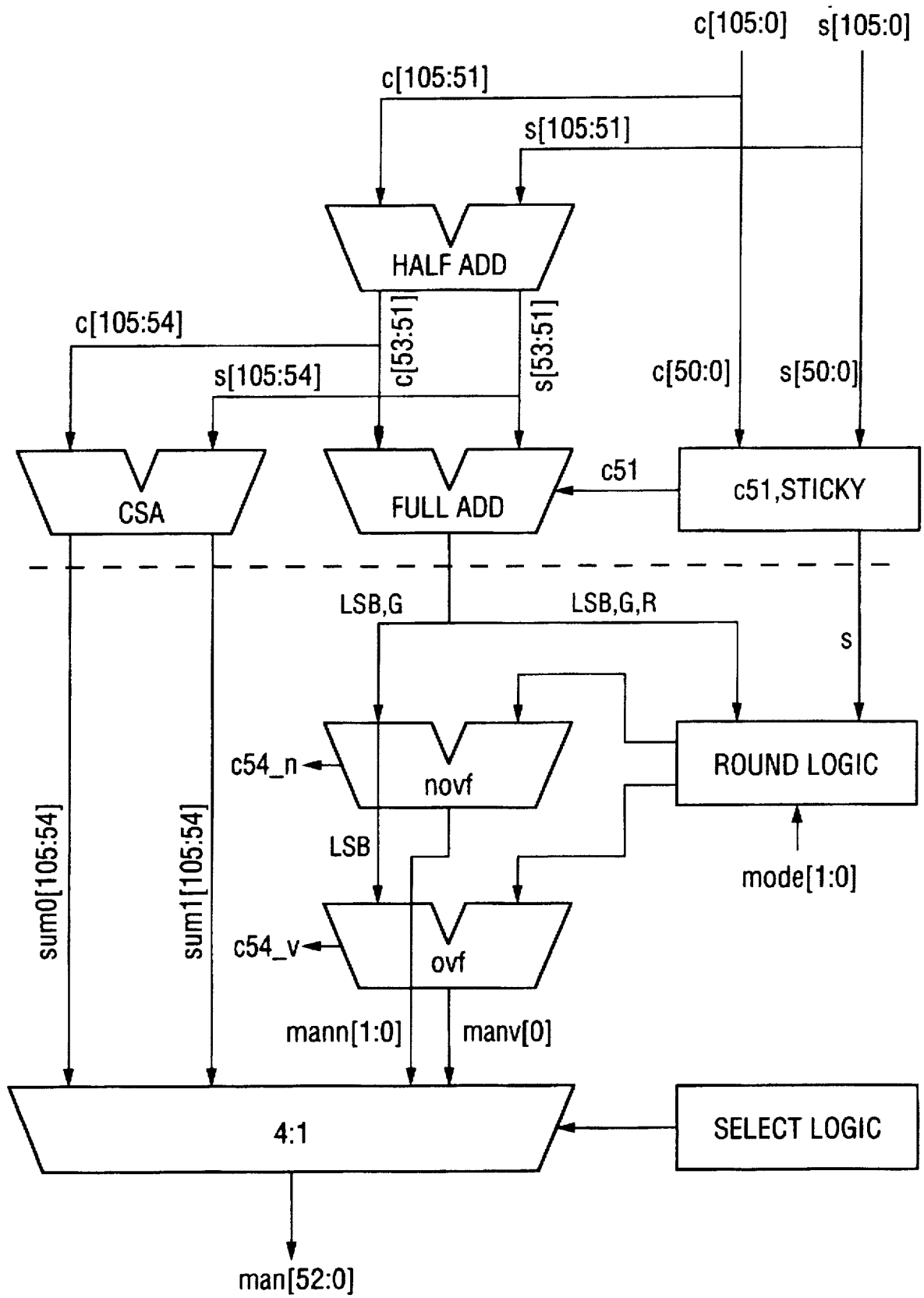
FIG. 7 is a functional block diagram of the rounding datapath and logic of the binary tree of FIG. 1.

Referring to FIG. 7, the final add operation and rounding are done in separate stages, with the dotted line representing pipeline registers. The lower 50 bits from the array are used to generate two signals: c51 and S. The c51 signal is the carry into bit 51. Bits 53 through 51 along with c51 are added to create the L, G and R bits and the rest of the bits 105:54 are added using a conditional sum adder to form two results sum0[105:54] and sum1[105:54].

Because of the c51 signal and a rounding that may occur at bits 53 or 52, there is a possibility of introducing two carries into bit position 54. To ensure that only one carry is propagated into bit 54, a row of half-adders is used at bits 105 through 51.

To correctly handle the case of overflow after rounding, two adders, ovf and novf, are used to generate the signals c54—v and c54—n, respectively, which are needed by the final selection logic. The c54—v and c54—n are the carries into bit position 54 assuming an overflow and non-overflow, respectively. The L, G, R, S and rounding mode bits are used by the rounding logic to generate two rounding values. One value assumes a mantissa overflow and the other assumes no mantissa overflow. These rounding bits are added to the L and {L,G} bits to form the lower one and two bits of the resulting mantissa for overflow (manv) and non-overflow (mann), respectively.

The final select logic combines the appropriate sum0 and sum1 from the conditional sum adder with either manv or mann to form the final mantissa. Table 3 shows the truth table for the selection logic. The key to the table is the expression for the Overflow signal, shown in Equation 8. The first expression refers to the case where the MSB is set as a result of a carry within the addition of the 51 bits without a carry into bit 54. The second expression refers to the case where the MSB is set due to some carry into bit 54 in the non-overflow case. This carry may be due to rounding itself, or the case of overflow after rounding.

$$\text{Overflow} = \text{sum0}[105] + (c54\_n \cdot \text{sum1}[105]) \tag{8}$$

TABLE 3

| SELECTION LOGIC | | | |
|---|---|---|---|
| Overflow | c54_n | C54_v | Select |
| 0 | 0 | x | sum0{104:54}, mann[1:0] |
| 0 | 1 | x | sum1{104:54}, mann[1:0] |
| 1 | x | 0 | sum0{105:54}, manv[0] |
| 1 | x | 1 | sum1{105:54}, manv[0] |

The rounding for multiplication is similar to that needed for division and square root. In the interest of saving area, multiplication, division and square root all share the same rounding hardware. Only additional multiplexing between the multiply, divide, or square root results is required before the inputs to the block shown in FIG. 7.

One difference, however, between multiplication, division and square root is the handling of the mantissas overflow. In multiplication, the incremented exponent is used if an overflow occurs. In division and square root, however, the decimal point is taken to be immediately to the right of the MSB. Therefore, if the mantissa's MSB is zero, then the decremented exponent is selected. Table 4 shows how the exponent is selected for multiplication, division and square root.

TABLE 4

| EXPONENT SELECTION FOR MULTIPLY AND DIVIDE | | |
|---|---|---|
| MANTISSA | MULTIPLY | DIVIDE/SQRT |
| Overflow | $e_r + 1$ | $e_r$ |
| Non-overflow | $e_r$ | $e_r - 1$ |

In accordance with foregoing discussion, a high-speed floating point multiplier in accordance with the present invention provides delay matching techniques in the multiplier tree and in the final addition stages, and rounding hardware which is shared with the divide and square root units.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated, double-precision floating point multiplier circuit, said multiplier circuit comprising:

a plurality of input signal terminals;

a plurality of output signal terminals; and a binary tree adder array, coupled to said pluralities of input and output signal terminals, for receiving a plurality of multiplier data and a plurality of multiplicand data via said plurality of input signal terminals and in response thereto providing a plurality of product data via said plurality of output signal terminals;

wherein said binary tree adder array includes a plurality of rows of adders which are interleaved, is integrated in a regular structure with a plurality of edges and is justified along a first one of said plurality of edges, and wherein said pluralities of input and output signal terminals are located along a second one of said plurality of edges, and further wherein selected ones of said plurality of rows of adders contain one or more adders which are associated with other ones of said plurality of rows of adders such that said selected ones and said other ones of said plurality of rows of adders contain approximately equal numbers of adders.

2. The apparatus of claim 1, wherein said plurality of rows of adders includes pluralities of interconnections between adjacent ones of said plurality of rows of adders, and wherein corresponding ones of said pluralities of interconnections have approximately equal lengths among said plurality of rows of adders.

3. The apparatus of claim 1, wherein said binary tree adder array has a folded three-stage pipeline structure.

4. The apparatus of claim 1, wherein said binary tree adder array comprises:

an encoder stage, coupled to said plurality of input signal terminals, for receiving said plurality of multiplier data and said plurality of multiplicand data and in response thereto providing a plurality of partial product data;

an adder array stage, coupled to said encoder stage, for receiving and summing said plurality of partial product data and in accordance therewith providing a plurality of sum data; and an output adder stage, coupled to said adder array stage and said plurality of output signal terminals, for receiving and summing said plurality of sum data and in accordance therewith providing said plurality of product data.

5. The apparatus of claim 4, wherein said adder array stage comprises a plurality of 4:2 compressors.

6. The apparatus of claim 4, wherein said output adder stage comprises a conditional sum adder.

7. The apparatus of claim 1, further comprising an integrated circuit into which said multiplier circuit is integrated.

8. The apparatus of claim 1, further comprising a computer into which said multiplier circuit is incorporated.

9. A method of providing an apparatus including an integrated, double-precision floating point multiplier circuit, said method comprising the steps of:

providing a plurality of input signal terminals;

providing a plurality of output signal terminals; and providing a binary tree adder array, coupled to said pluralities of input and output signal terminals, for receiving a plurality of multiplier data and a plurality of multiplicand data via said plurality of input signal terminals and in response thereto providing a plurality of product data via said plurality of output signal terminals;

wherein said binary tree adder array includes a plurality of rows of adders which are interleaved, is integrated in a regular structure with a plurality of edges and is justified along a first one of said plurality of edges, and wherein said pluralities of input and output signal terminals are located along a second one of said plurality of edges, and further wherein selected ones of said plurality of rows of adders contain one or more adders which are associated with other ones of said plurality of rows of adders such that said selected ones and said other ones of said plurality of rows of adders contain approximately equal numbers of adders.

10. The method of claim 9, wherein said step of providing said binary tree adder array which includes said plurality of rows of adders comprises providing said binary tree adder array which includes said plurality of rows of adders with pluralities of interconnections between adjacent ones of said plurality of rows of adders, and wherein corresponding ones of said pluralities of interconnections have approximately equal lengths among said plurality of rows of adders.

11. The method of claim 9, wherein said step of providing said binary tree adder array comprises providing a binary tree adder array which has a folded three-stage pipeline structure.

12. The method of claim 9, wherein said step of providing a binary tree adder array comprises:

providing an encoder stage, coupled to said plurality of input signal terminals, for receiving said plurality of multiplier data and said plurality of multiplicand data and in response thereto providing a plurality of partial product data;

providing an adder array stage, coupled to said encoder stage, for receiving and summing said plurality of partial product data and in accordance therewith providing a plurality of sum data; and providing an output adder stage, coupled to said adder array stage and said plurality of output signal terminals, for receiving and summing said plurality of sum data and in accordance therewith providing said plurality of product data.

13. The method of claim 12, wherein said step of providing an adder array stage comprises providing a plurality of 4:2 compressors.

14. The method of claim 12, wherein said step of providing an output adder stage comprises providing a conditional sum adder.

15. The method of claim 9, further comprising the step of providing an integrated circuit into which said multiplier circuit is integrated.

16. The method of claim 9, further comprising the step of providing a computer into which said multiplier circuit is incorporated.

17. A method of performing double-precision floating point multiplication within an integrated structure, said method comprising the steps of:

receiving a plurality of multiplier data and a plurality of multiplicand data via a plurality of input signal terminals; and providing, via a plurality of output signal terminals, a plurality of product data with a binary tree adder array in response to said pluralities of multiplier and multiplicand data;

wherein said binary tree adder array includes a plurality of rows of adders which are interleaved, is integrated in a regular structure with a plurality of edges and is justified along a first one of said plurality of edges, and wherein said pluralities of input and output signal terminals are located along a second one of said plurality of edges, and further wherein selected ones of said plurality of rows of adders contain one or more adders which are associated with other ones of said plurality of rows of adders such that said selected ones and said other ones of said plurality of rows of adders contain approximately equal numbers of adders.

18. The method of claim 17, wherein said step of providing, via a plurality of output signal terminals, a plurality of product data with said binary tree adder array which includes said plurality of rows of adders in response to said pluralities of multiplier and multiplicand data comprises providing said plurality of product data with said binary tree adder array which includes said plurality of rows of adders with pluralities of interconnections between adjacent ones of said plurality of rows of adders, and wherein corresponding ones of said pluralities of interconnections have approximately equal lengths among said plurality of rows of adders.

19. The method of claim 17, wherein said step of providing, via a plurality of output signal terminals, a plurality of product data with said binary tree adder array in response to said pluralities of multiplier and multiplicand data comprises providing said plurality of product data with a binary tree adder array which has a folded three-stage pipeline structure.

20. The method of claim 17, wherein said step of providing, via a plurality of output signal terminals, a plurality of product data with a binary tree adder array in response to said pluralities of multiplier and multiplicand data comprises:

receiving said plurality of multiplier data and said plurality of multiplicand data and in response thereto providing a plurality of partial product data with an encoder stage;

receiving and summing said plurality of partial product data and in accordance therewith providing a plurality of sum data with an adder array stage; and receiving and summing said plurality of sum data and in accordance therewith providing said plurality of product data with an output adder stage.

21. The method of claim 20, wherein said step of receiving and summing said plurality of partial product data and in accordance therewith providing a plurality of sum data with an adder array stage comprises receiving and summing said plurality of partial product data and in accordance therewith providing said plurality of sum data with a plurality of 4:2 compressors.

22. The method of claim 20, wherein said step of receiving and summing said plurality of sum data and in accordance therewith providing said plurality of product data with an output adder stage comprises receiving and summing said plurality of sum data and in accordance therewith providing said plurality of product data with a conditional sum adder.

23. The method of claim 17, further comprising the step of performing the recited steps within an integrated circuit.

24. The method of claim 17, further comprising the step of performing the recited steps within a computer.

* * * * *